United States Patent
Nelogal et al.

(10) Patent No.: US 8,726,070 B2
(45) Date of Patent: May 13, 2014

(54) SYSTEM AND METHOD FOR INFORMATION HANDLING SYSTEM REDUNDANT STORAGE REBUILD

(75) Inventors: Chandrashekar Nelogal, Round Rock, TX (US); Bang Kim Le, Broomfield, CO (US); Frank Widjaja Yu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 427 days.

(21) Appl. No.: 12/890,917

(22) Filed: Sep. 27, 2010

(65) Prior Publication Data

US 2012/0079317 A1      Mar. 29, 2012

(51) Int. Cl.
*G06F 11/00* (2006.01)

(52) U.S. Cl.
USPC ........... 714/6.22; 714/6.24; 714/6.32; 714/52

(58) Field of Classification Search
USPC .................................. 714/6.22, 6.24, 6.32, 52
See application file for complete search history.

(56) References Cited

U.S. PATENT DOCUMENTS

| | | | |
|---|---|---|---|
| 5,390,187 A * | 2/1995 | Stallmo ........................ | 714/6.32 |
| 6,516,425 B1 * | 2/2003 | Belhadj et al. ............... | 714/6.12 |
| 7,069,382 B2 | 6/2006 | Horn et al. | |
| 7,111,115 B2 * | 9/2006 | Peters et al. .................. | 711/112 |
| 7,213,165 B2 * | 5/2007 | Umberger et al. ........... | 714/6.32 |
| 7,249,278 B2 * | 7/2007 | Fukuda .......................... | 714/6.32 |
| 7,472,223 B1 * | 12/2008 | Ofer ............................ | 711/112 |
| 8,006,128 B2 * | 8/2011 | Olster .......................... | 714/6.32 |
| 8,049,980 B1 * | 11/2011 | Emami ......................... | 360/31 |
| 8,055,942 B2 * | 11/2011 | Haines et al. ................. | 714/16 |
| 2005/0193239 A1 * | 9/2005 | Shackelford .................. | 714/7 |
| 2006/0041793 A1 | 2/2006 | Cherian et al. | |
| 2006/0212748 A1 * | 9/2006 | Mochizuki et al. ............ | 714/6 |
| 2007/0101187 A1 | 5/2007 | Daikokuya et al. | |
| 2008/0250269 A1 | 10/2008 | Cherian et al. | |
| 2010/0031082 A1 * | 2/2010 | Olster ............................ | 714/7 |

* cited by examiner

*Primary Examiner* — Joshua P Lottich
(74) *Attorney, Agent, or Firm* — Terrile, Cannatti, Chambers & Holland, LLP; Robert W. Holland

(57) ABSTRACT

Out-of-order reconstruction of a RAID storage device at a replacement storage device enables the replacement storage device to execute I/O for reconstructed regions during reconstruction of the replacement storage device. In one embodiment, the failed storage device is analyzed to find recoverable information, which is copied to the replacement storage device to reduce the need for reconstruction. In another embodiment, the priority for region's reconstruction is increased upon detection of an I/O to the region. The I/O is queued until reconstruction of the region and then executed after reconstruction of that region so that I/O at the region need not be repeated during reconstruction of the remainder of the replacement storage device.

20 Claims, 3 Drawing Sheets

SYSTEM AND METHOD FOR INFORMATION HANDLING SYSTEM REDUNDANT STORAGE REBUILD

BACKGROUND OF THE INVENTION

1. Field of the Invention

The present invention relates in general to the field of information handling system storage, and more particularly to a system and method for information handling system redundant storage rebuild.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

As information handling systems have become increasingly prevalent in enterprises and homes, they have generated tremendous amounts of information for storage and subsequent access. For example, businesses maintain customer, accounting, inventory, research, product design and other critical types of information. As another example, individuals maintain personal financial information, pictures, videos and other important personal information. In order to protect important information from disappearing in the event of a storage failure, enterprises and individuals often use redundant storage techniques. One such category of redundant storage techniques is the use of a redundant array of independent disks (RAID). Although a variety of RAID configurations exists, a typical RAID array combines multiple hard disk drives into LUNs that distributes a copy of information stored on any one hard disk drive to at least one other hard disk drive of the array so that a redundant copy of all information in the array exists for use in the event of a hard disk drive failure. To accomplish such redundancy, each hard disk drive is divided into fixed-size stripe units made of several disk sectors, such as units of 8 KB to 256 KB of storage. A parity map maintains a relationship between these units to track where the units are stored on different hard disk drives. After a failure occurs at a hard disk drive, the information stored on the failed hard disk drive is regenerated from the parity data and written to a replacement hard disk drive.

One difficulty with recreating a failed hard disk drive on replacement hard disk drive is that the data reconstruction operation, also known as an XOR operation, is time consuming and must include several I/O's made to all disk units of the array during the rebuild process. Since the rebuild process for servicing Input/Output (I/O) uses both a rebuild pointer and rebuild status for each region, these parameters must be maintained during the rebuild. During a rebuild process, a RAID controller performs the data reconstruction operation by rebuilding each logical unit starting with a first logical block of the failed hard disk drive and proceeds sequentially to the last logical block with I/O regeneration happening at the granularity of stripe element size. The result of a conventional rebuild process is an identical drive, however reconstructing the data with XOR operations is very time consuming and the overhead associated with the sequential XOR operations can slow overall system performance. For example, one typical 1TB replacement drive re-creation took 16 hours to complete. Until the failed drive is re-created, failure of another hard disk drive within the same array can result in permanent loss of information. Some steps can result in reduced rebuild time, such as avoiding rebuild of portions of the failed drive that did not save data, however, performing the XOR calculations to rebuild the remaining portions of the drive still consumes time and resources.

Due to increased time to rebuild, the LUN is susceptible to subsequent hard disk drive failure. Hence there is a need to reduce the overall time taken to rebuild a failed drive of a RAID array at a replacement drive.

SUMMARY OF THE INVENTION

Therefore a need has arisen for a system and method which rebuilds redundant storage using less time and resources.

In accordance with the present invention, a system and method are provided which substantially reduce the disadvantages and problems associated with previous methods and systems for rebuilding redundant storage. Instead of the traditional method where data is reconstructed sequentially from the beginning to the end of the hard drive using parity information, whenever possible old data is retrieved directly from a partially failed disk to avoid costly reconstruction and reconstruction is performed out of order based upon concurrent host I/O directed to the failed storage device during reconstruction. Regions associated with an I/O are given an increased priority for reconstruction so that I/O can be executed directly on a replacement disk to avoid the time consuming parity calculations based on data of other members of the array. A failed storage device is reconstructed out of order based upon recoverable information retrieved from the failed storage device and I/O directed to the failed storage device during reconstruction. Regions associated with an I/O are given an increased priority for reconstruction so that I/O are executed on reconstructed regions of a replacement storage device.

More specifically, an information handling system has plural processing components that cooperate to generate information for storage, such as a CPU, RAM and a chipset. The processing components send I/O commands to a RAID controller for execution at plural storage devices of a RAID array, such as write and read commands. The RAID controller stores information on the plural storage devices with redundant information, such as parity information to one or more strips within each stripe of the array. If a storage device fails, a reconstruction module of the RAID controller retrieves redundant information from functioning storage devices to reconstruct the failed storage device. A priority module adjusts the order in which reconstruction occurs to support a more efficient reconstruction. The priority module analyzes the failed storage device to recover information available from the failed storage device for copying to the replacement storage device. The analysis returns whether or not the disk drive is partially failed and some data can still be retrieved from it. Based on this information, the reconstruction operation makes decisions to retrieve old data either by quickly reading from partial failed disk or following the well known data reconstruction method based on the RAID level of the array. The priority module tracks regions of the replacement storage device that are reconstructed so that I/O directed to reconstructed regions are handled by the replacement storage device while other regions are reconstructed. If the priority module detects an I/O associated with a region of the failed storage device that is not yet reconstructed on the replacement storage device, the priority module increases the priority of reconstruction of that region and queues the I/O until the reconstruction is performed so that the I/O is executed at the replacement storage device. Once the region is completely reconstructed, a status is updated and future I/O to that region are executed at the replacement disk.

The present invention provides a number of important technical advantages. One example of an important technical advantage is that a redundant storage device is rebuilt in a rapid manner with reduced resources. In one example embodiment, checking a failed storage device to determine whether recoverable information exists helps to reduce rebuild time and resources by avoiding the need to perform parity data calculations, such as XOR operations, at all. Where parity operations are required, the time needed to perform the parity operations is reduced by performing the operations out of order, which avoids rebuilding the same region more than once as might occur with the traditional method. Prioritizing the order for rebuilding based upon current I/O operations means that an I/O, such as a write, received from a host is always executed in a non-reconstructed mode and thus latency at most would only incur on the first I/O accessing the non-reconstructed region. In one example embodiment of a partial failed drive, a rebuild time for a RAID hard disk drive storage device was reduced from 16 hours down to 2 hours.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Out-of-order reconstruction, implemented by an information handling system, of a failed storage device decreases resources required for the reconstruction at a replacement storage device. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
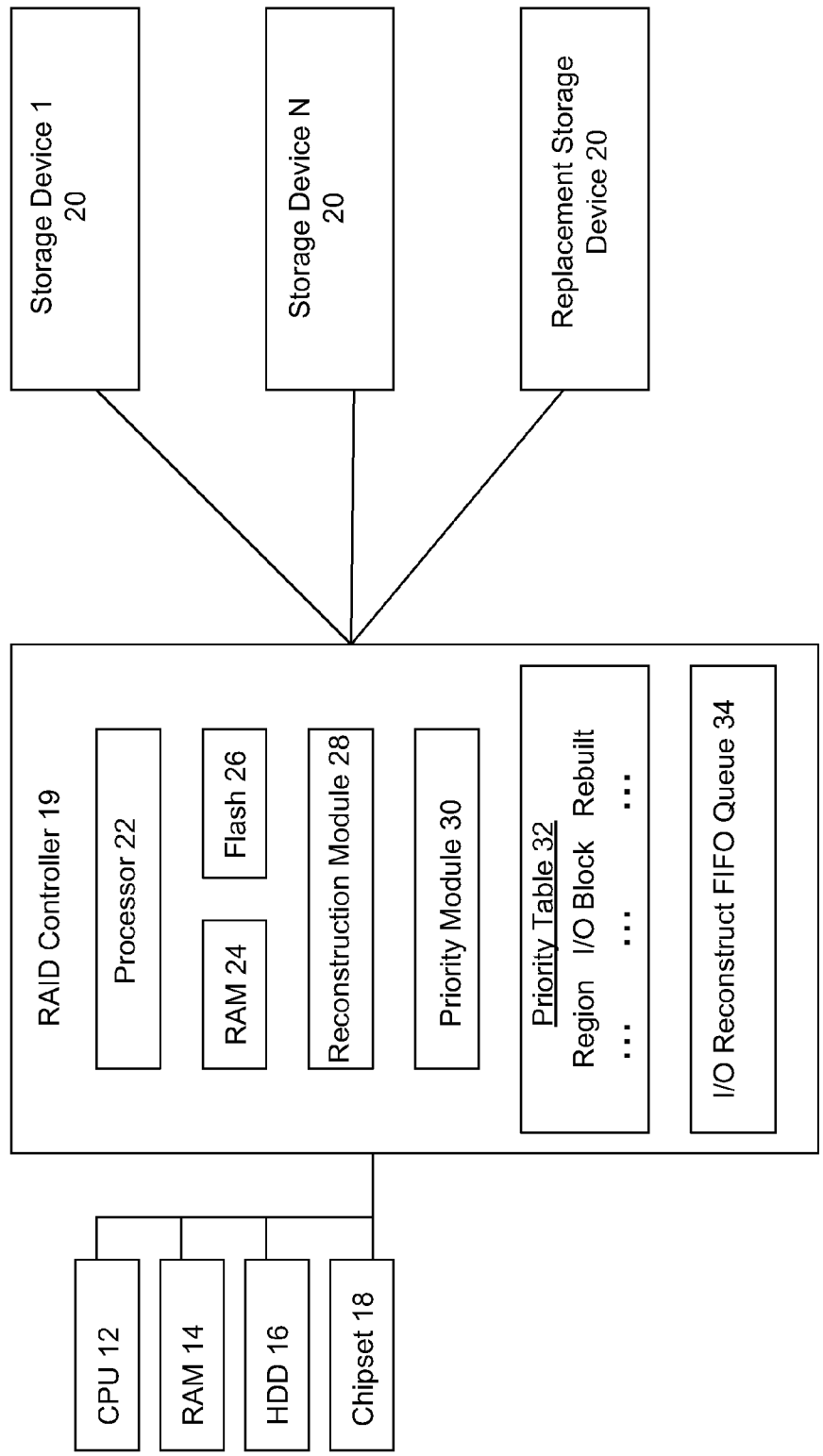
FIG. 1 depicts a block diagram of an information handling system having a RAID array with out-of-order reconstruction of a failed storage device.

Referring now to FIG. 1, a block diagram depicts an information handling system 10 having a RAID array with out-of-order reconstruction of a failed storage device. Information handling system 10 is built from processing components that cooperate to process information, such as a CPU 12, RAM 14, hard disk drive 16, chipset 18 and a RAID controller 19. Information generated by the processing components, such as by an application running on CPU 12, is stored by RAID controller 19 with redundancy on storage devices 20, such as hard disk drives or solid state drives. For example, RAID controller 19 maintains a redundant copy of stored information by keeping a copy of the information on at least two separate storage devices 20. In the example embodiment depicted by FIG. 1, at least one storage device 20 is maintained without storing information so that it can act as a replacement storage device in the event of a storage device failure. RAID controller 19 has a processor 22, RAM 24 and flash memory 26, which cooperate to execute instructions for maintaining redundant storage of information on storage devices 20. For example, if a storage device 20 fails, a reconstruction module 28 executes to reconstruct the information stored on the storage device 20 at a replacement storage device so that the replacement storage device can take the place of the failed storage device in the RAID array. For a complete storage device failure that occurs without any host I/O from information handling system 10 directed to the failed storage device 20, reconstruction module 28 performs conventional reconstruction at replacement storage device 20 with an XOR parity operation sequentially from the first to the last logical unit of the failed storage device 20. The XOR parity operation finds the redundant copy of each logical unit on operational storage devices and copies the redundant copy to the replacement storage device to regenerate the failed storage device at the replacement storage device.

RAID controller 19 includes a priority module 30 that aids in the reconstruction of a failed storage device 20 at a replacement storage device 20 by adjusting the order in which reconstruction takes place based upon the type of failure and I/O operations, such writes at the host. Upon detection of a failed storage device 20, priority module 30 analyzes the failure to determine if recoverable information exists on the failed storage device. For example, a failure of write operations at a storage device 20 makes the storage device unusable for storing additional information but leaves existing information available to read so that priority module 30 reads the information and copies the information from the failed storage device to the replacement storage device. As another example, failure at one platter of a hard disk drive storage device leaves the other platters still readable so that priority module 30 reads information stored on functional platters and copies the information from the functional platters to associated regions of the replacement storage device. A priority table 32 tracks regions that are rebuilt by copying recoverable information from the failed storage device to the replacement storage device so that reconstruction of the regions by the parity operation is not needed, thus saving time and unnecessary processing during the reconstruction process.

Under a conventional reconstruction that proceeds sequentially from a first logical unit to an end logical unit, host I/O commands are tracked by a pointer during the reconstruction process. On the other hand, in order to avoid complex parity operations using a pointer to track I/O during reconstruction of a failed storage device to a replacement storage device, priority module 30 prevents execution of host I/O under a reconstruction mode. Instead, priority module 30 coordinates the operation of reconstruction module 28 so that un-reconstructed regions associated with a host I/O are first reconstructed at the replacement storage device and then, once the region associated with the I/O is reconstructed, the I/O is executed on the replacement storage device reconstructed region. As reconstruction proceeds, priority table 32 tracks the status of regions as having an I/O block during reconstruction, as reconstructed or as not yet reconstructed. If priority module 30 detects an I/O associated with a reconstructed region, then priority module 30 allows execution of the I/O at the replacement storage device in the reconstructed region. If priority module 30 detects an I/O associated with an un-reconstructed region, then priority module 30 indicts the region as blocked in table 32 and places the I/O in a FIFO reconstruction queue 34. As reconstruction module 28 finishes reconstruction of a region, priority module 30 places the oldest region from FIFO queue 34 into the pointer queue of reconstruction module 28. Once a queued region is reconstructed, priority module 30 updates priority table 32 to indicate that the region is reconstructed and allows execution of I/O queued for the region, including I/O that arrived while the region was blocked for reconstruction. By reconstructing regions out-of-order, each region is reconstructed only once and then accessed with normal I/O commands so that reconstruction is accomplished with less time and less processing. In one embodiment, the regions are fixed size units of between 512 KB and 2 MB with the region size based upon the relative efficiency of the rebuild process versus the queue size need to store I/O pending rebuild of a region.

Figure 2:
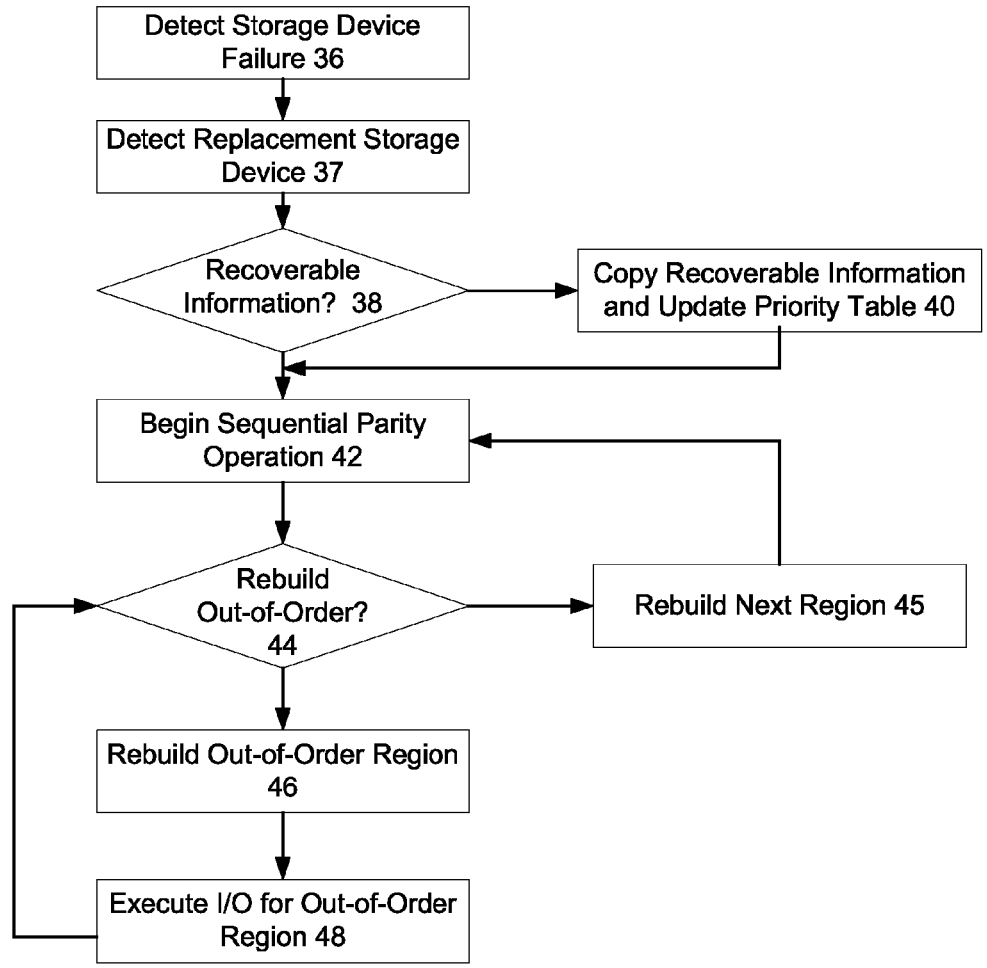
FIG. 2 depicts a flow diagram of a process for out-of-order reconstruction of a failed storage device.

Referring now to FIG. 2, a flow diagram depicts a process for out-of-order reconstruction of a failed storage device. The process begins at step 36 with detection of a failed storage device in a RAID array. At step 37, a suitable replacement storage device is detected, such as a device kept at ready to act as a replacement in the event of a failure. At step 38, a determination is made of whether the failed storage device has recoverable information, such as when failure occurs for writes only or for only portions of the storage device. If yes, the process continues to step 40 to copy the recoverable information from the partially-failed storage device to a replacement storage device and to indicate in the priority table the areas of the replacement storage device that are rebuilt. At step 40, reconstruction of the failed storage device on the replacement storage device is initiated with a conventional parity operation in sequential order for those regions not rebuilt with recoverable information. The process continues to step 42 to determine the next region for rebuild, such as by reference to a conventional rebuild pointer. If at step 44 no I/O exists for processing from the host, the process continues to step 45 for the rebuild pointer to indicate the next sequential region as designated for rebuild. The process continues sequentially at step 42 as long as the rebuild pointer is populated with sequential regions. If, on the other hand, at step 44 a host I/O command is awaiting execution, the rebuild pointer is populated with an out-of-order region, the process continues to step 46 to rebuild the out-of-order region and step 48 to execute I/O associated with the out-of-order region. Out-of-order regions that have pending I/O are reconstructed until all queued I/O are completed, and then the process returns to step 42 for sequential rebuild of remaining regions.

Figure 3:
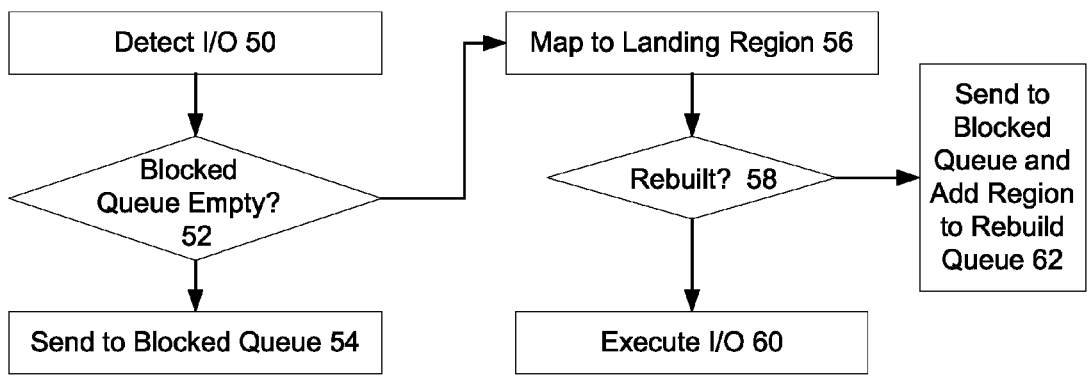
FIG. 3 depicts a flow diagram of a process for handling I/O commands directed to a failed storage device during reconstruction of the failed storage device at a replacement storage device.

Referring now to FIG. 3, a flow diagram depicts a process for handling I/O commands directed to a failed storage device during reconstruction of the failed storage device at a replacement storage device. The process begins at step 50 with detection of an I/O command directed to a failed storage device. At step 52, a determination is made of whether the queue of blocked I/O is empty. If the queue is not empty, meaning that at least one I/O command is pending execution on the replacement storage device, the process continues to step 54 to add the I/O to the queue of blocked I/O, which will be handled on a first in first out basis. If at step 52 the blocked queue is empty, meaning that no I/O are pending execution at the replacement storage device, then the process continues to step 56 to map the landing region for the I/O on the replacement storage device. At step 58 a determination is made of whether the mapped region is a rebuilt region or still in need of reconstruction. If the mapped region is rebuilt, then the process continues to step 60 for execution of the I/O at the replacement storage device. If at step 58 the mapped region is not rebuilt, the process continues to step 62 to place the I/O in the queue of I/O commands blocked from execution pending rebuild of the region associated with the I/O. Once an I/O is placed in the blocked queue, the region associated with the I/O is placed in a prioritized order for rebuild and will advance out-of-order for a rebuild based upon the order in which the I/O associated with the region was received. Once the rebuild of the region is accomplished, the I/O is executed by picking up the serialization loop for the I/O and attempting to process all I/O placed in the blocked queue. In this way, other blocked I/O associated with the newly rebuilt region are executed on the region while I/O not associated with a rebuilt region remain in the blocked queue to proceed to prioritized rebuild.

Figure 4:
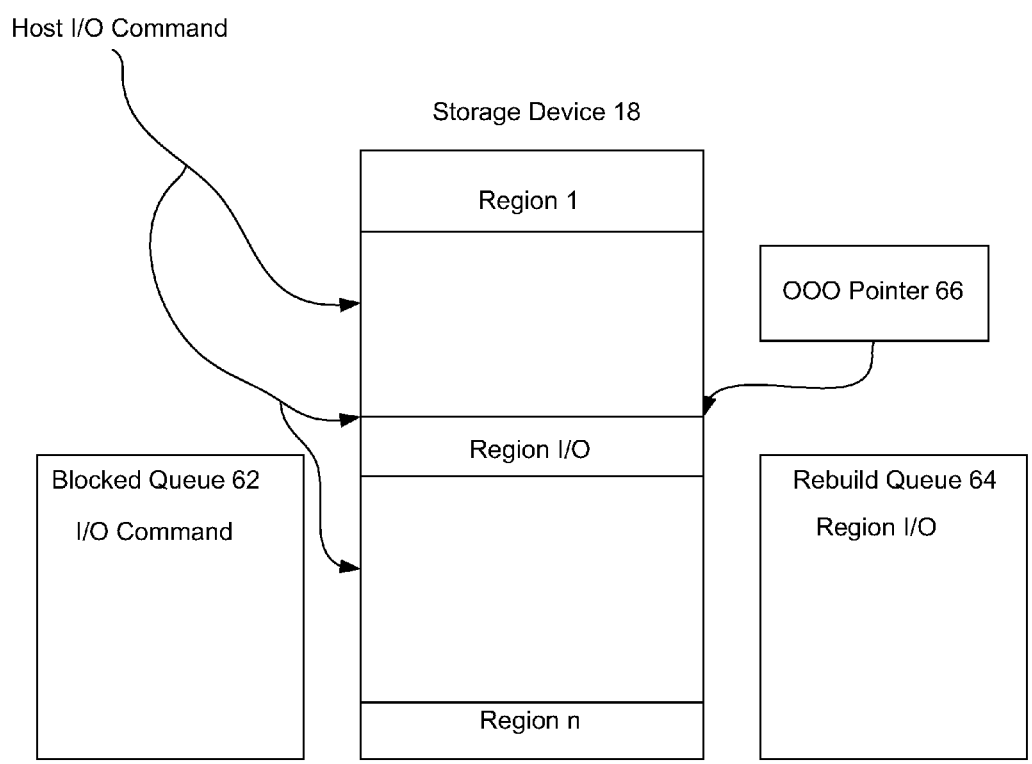
FIG. 4 depicts a block diagram of an example embodiment of a blocked queue and a rebuild queue for managing out-of-order replacement storage device rebuild.

Referring now to FIG. 4, a block diagram depicts an example embodiment of a blocked queue 62 and a rebuild queue 64 for managing out-of-order rebuild of a replacement storage device. During an idle time in which no host I/O commands are issued to storage device 20, storage device 20 has a rebuild operation, such as a parity operation, that sequentially rebuilds from a first region, $Region_1$, to a last region, $Region_n$. A host I/O to storage device 20, such as a read or write command, is analyzed to determine the region associated with the I/O command, in the example embodiment depicted as $Region_{I/O}$, and to determine whether the $Region_{I/O}$ has been rebuilt. If a rebuild is already accomplished at $Region_{I/O}$ then the host I/O command is executed to $Region_{I/O}$. If a region associated with a host I/O command has not been rebuilt, then the I/O command is placed in blocked queue 62 to await execution after its associated region is rebuilt. When a host I/O command is placed in blocked queue 62, the region associated with the host I/O command is placed in a rebuild queue 64. The regions in rebuild queue 64 are prioritized for rebuild over sequential regions with the regions in rebuild queue 64 handled on a first-in-first-out basis, such as by advancing the oldest region in rebuild queue 64 to an out-of-order pointer 66 that is next for rebuild. Once an out-of-order region is rebuilt, blocked queue 62 is searched to locate all I/O commands associated with the newly-rebuilt region, and the I/O commands associated with the newly-rebuilt region are executed on the newly-rebuilt region.

Although the present invention has been described in detail, it should be understood that various changes, substitutions and alterations can be made hereto without departing from the spirit and scope of the invention as defined by the appended claims.

What is claimed is:

1. A method for rebuilding a first storage device of a RAID array at a replacement storage device, the RAID array having plural storage devices, each storage device storing information in logical units, each logical unit having plural stripe units, the method comprising:
    establishing an initial order for rebuilding regions of the first storage device from the plural storage devices at the replacement storage device, each region having one or more stripe units;
    detecting an I/O command for writing to a first region of the first storage device;
    queuing the I/O command;
    prioritizing re-creation of the first region at the replacement storage device by changing the initial order to move the first region up in the rebuild order; and
    performing the queued I/O command at the replacement storage device after the first region is re-created.

2. The method of claim 1 further comprising:
    determining regions associated with the first storage device that do not have an associated I/O command; and
    performing a parity operation to sequentially re-create the regions that do not have an associated I/O command on the replacement storage device from the RAID array of plural storage devices.

3. The method of claim 1 wherein establishing an initial order comprises establishing a parity operation to sequentially rebuild the regions.

4. The method of claim 3 wherein each region rebuild retrieves plural stripes from plural RAID array storage devices.

5. The method of claim 1 rebuilding the first region by retrieving plural stripes associated with the first region from the RAID array storage devices.

6. The method of claim 5 wherein rebuilding the first region further comprises adjusting rebuild pointers to cause the first region to rebuild out of the initial order.

7. The method of claim 1 further comprising:
    analyzing other queued I/O commands to determine any queued I/O commands associated with the first region; and
    performing all queued I/O commands associated with the first region upon completing rebuild of the first region.

8. The method of claim 1 wherein the plural storage devices comprise hard disk drives.

9. A method for reconstructing a first storage device of a RAID array at a replacement storage device, the RAID array having plural storage devices, the method comprising:
    establishing a sequential order for reconstructing plural regions of the first storage device;
    detecting an I/O to a first region of the first storage device of the RAID array;
    increasing the priority of reconstruction of the first region at the replacement storage device of the RAID array from the sequential order;
    reconstructing the first region with the increased priority by retrieving stripes associated with the first region from the RAID array; and
    performing the I/O at the first region of the replacement storage device after completion of the reconstruction of the first region at the replacement storage device.

10. The method of claim 9 wherein the I/O comprises a write of information to the first region.

11. The method of claim 9 wherein increasing the priority further comprises:
    creating a queue of I/O to plural regions of the first storage device, the queue having the order in which I/O are received, each I/O associated with one or more regions of the first storage device; and
    reconstructing the regions of the first storage device at the replacement storage device in the order of the queue.

12. The method of claim 11 further comprising:
    determining that the queue is empty; and
    reconstructing the first storage device at the replacement storage device in the sequential order of regions.

13. The method of claim 9 further comprising:
    determining that the first region associated with an I/O has been reconstructed at the time of the I/O; and
    executing the I/O based upon the determining.

14. The method of claim 9 wherein reconstructing the first region further comprises reconstructing the first region with a parity operation.

15. The method of claim 9 further comprising:
    analyzing other queued I/O commands to determine any queued I/O commands associated with the first region; and
    performing all queued I/O commands associated with the first region upon completing reconstruction of the first region.

16. An information handling system comprising:
    plural components operable to process information;
    plural storage devices operable to store the information;
    a RAID controller interfaced with the plural storage devices to coordinate storage of the information at the storage devices as an array having redundancy;
    a reconstruction module interfaced with the RAID controller and operable to reconstruct information stored on a first of the plural storage devices onto a replacement storage device, the reconstruction module reconstructing the first storage device in a predetermined order using a parity operation that retrieves information from the array; and
    a priority module interfaced with the reconstruction module and operable to adjust the predetermined order based upon one or more predetermined factors, the predetermined factors including at least detection of an I/O directed to the first storage device, the priority module increasing the priority for reconstruction of a region of the first storage device that is associated with the I/O.

17. The information handling system of claim 16 wherein the predetermined factors comprise recoverable information on the first storage device, the priority module reconstructing the first storage device on the replacement storage device by copying the recoverable information from the first storage device to the replacement storage device before reconstructing other information with the rebuild operation.

18. The information handling system of claim 16 wherein the priority module is further operable to search a queue of I/O for I/O directed to a reconstructed region and to execute the I/O directed to the reconstructed region upon completing reconstruction of the reconstructed region.

19. The information handling system of claim 16 further comprising a priority table populated with I/O directed to the first storage region and an order of receipt of the I/O directed to the first storage region, the priority module operable to reconstruct the first storage device at the replacement storage device according to the order of receipt of the I/O.

20. The information handling system of claim 16 wherein the priority module is further operable to determine if reconstruction has occurred in a region of the replacement storage device and to allow writes to the region of the replacement storage device during reconstruction of the replacement storage device.

\* \* \* \* \*